(12) United States Patent
Homier et al.

(10) Patent No.: US 8,056,954 B2
(45) Date of Patent: Nov. 15, 2011

(54) FOLD FLAT SEAT ASSEMBLY WITH DRIVE LINK

(75) Inventors: Robert I. Homier, Plymouth, MI (US); M. Jeffry Corkins, Brighton, MI (US); Charles Falzone, Macomb, MI (US)

(73) Assignee: Intier Automotive Inc, Newmarket (CA)

( * ) Notice: Subject to any disclaimer, the term of this patent is extended or adjusted under 35 U.S.C. 154(b) by 279 days.

(21) Appl. No.: 12/444,216

(22) PCT Filed: Oct. 5, 2007

(86) PCT No.: PCT/CA2007/001786
§ 371 (c)(1),
(2), (4) Date: Apr. 3, 2009

(87) PCT Pub. No.: WO2008/040127
PCT Pub. Date: Apr. 10, 2008

(65) Prior Publication Data
US 2010/0026033 A1   Feb. 4, 2010

Related U.S. Application Data

(60) Provisional application No. 60/849,546, filed on Oct. 5, 2006.

(51) Int. Cl.
*B60N 2/02* (2006.01)
(52) U.S. Cl. .................. 296/65.05; 296/65.01; 297/321; 297/378.1
(58) Field of Classification Search ............... 296/65.01, 296/65.05, 65.09, 65.16; 248/424; 297/317, 297/321, 322, 331, 334, 340, 341, 342, 378.1, 297/378.12
See application file for complete search history.

(56) References Cited

U.S. PATENT DOCUMENTS

| | | | |
|---|---|---|---|
| 5,482,349 A | 1/1996 | Richter et al. |
| 5,588,707 A | 12/1996 | Bolsworth et al. |
| 6,070,934 A | 6/2000 | Schaeffer et al. |
| 6,113,191 A | 9/2000 | Seibold |
| 6,371,558 B1 | 4/2002 | Couasnon |
| 6,688,696 B2 | 2/2004 | Brush et al. |
| 6,902,236 B2 | 6/2005 | Tame |
| 7,014,263 B2 | 3/2006 | Mukoujima et al. |
| 7,040,704 B2 | 5/2006 | Epaud |
| 7,077,463 B2 | 7/2006 | Sun et al. |
| 2004/0251705 A1 | 12/2004 | Tame et al. |
| 2006/0163926 A1 | 7/2006 | Spies et al. |
| 2007/0228796 A1 | 10/2007 | Holdampf et al. |

FOREIGN PATENT DOCUMENTS

DE   10355486 A1   7/2004

(Continued)

*Primary Examiner* — Lori Lyjak
(74) *Attorney, Agent, or Firm* — Miller Canfield

(57) ABSTRACT

A seat assembly is provided for supporting an occupant above a floor in an automotive vehicle. The seat assembly includes a seat cushion that is adapted to be pivotally coupled to the floor for movement between a raised position spaced above the floor and a lowered position adjacent the floor. The seat assembly also includes a seat back that is adapted to be pivotally coupled to the floor for movement between an upright position and a folded position overlying the seat cushion. At least one drive link extends between a first end pivotally coupled to the seat back and a second end pivotally and slidably coupled to the seat cushion for automatically moving the seat cushion between the raised and lowered positions in response to pivoting the seat back between the upright and folded positions thereby defining a seating position and a stowed position of the seat assembly.

28 Claims, 15 Drawing Sheets

FOREIGN PATENT DOCUMENTS

| | | |
|---|---|---|
| DE | 10308685 B3 | 8/2004 |
| EP | 1361106 B1 | 11/2003 |
| EP | 1547856 A | 6/2005 |
| GB | 2155780 A | 10/1985 |
| JP | 2005161981 A | 6/2005 |
| JP | 2005280501 A | 10/2005 |
| JP | 2006142938 A | 6/2006 |
| WO | 2007138411 A | 12/2007 |

FOLD FLAT SEAT ASSEMBLY WITH DRIVE LINK

CROSS REFERENCE TO RELATED APPLICATION

This application claims priority to and all the benefits of U.S. Provisional Application Ser. No. 60/849,546, filed on Oct. 5, 2006 and entitled "Fold Flat Seat Assembly With Drive Link."

BACKGROUND OF THE INVENTION

1. Field of the Invention

The invention relates to a seat assembly for an automotive vehicle. More particularly, the invention relates to a seat assembly having a drive link for moving a seat cushion forward and downward along a floor of the vehicle in response to forwardly folding a seat back.

2. Description of Related Art

Automotive vehicles include one or more seat assemblies for supporting seat occupants within a passenger compartment of the vehicle. Typically, seat assemblies include a generally horizontal seat cushion spaced above a floor of the vehicle and a generally vertical seat back. It is well known in the seating art to provide a stowable seat assembly movable between a seating position for supporting the seat occupant above the floor and a stowed position lying flat against the floor, or nested within a recess formed in the floor.

Typically, in such seat assemblies, the seat back is pivotally coupled to the seat cushion for movement between a generally upright position and a folded position overlying the seat cushion. The seat cushion often includes a four bar linkage or front and rear legs extending between the seat cushion and the floor of the vehicle for moving the seat cushion between a raised position spaced above the floor and a lowered position resting along the floor. Typically, the pivotal movement of the seat back is actuated and controlled independently of the movement of the seat cushion, thus requiring separate operation of the seat back and seat cushion to move the seat assembly from the seating position to the stowed position.

It is therefore desirable to provide a mechanism or drive link assembly coupled between a seat back and a seat cushion for moving a seat assembly between a seating position and a stowed position in response to pivotal movement of the seat back between a generally upright position and a folded position overlying the seat cushion.

SUMMARY OF THE INVENTION

According to one aspect of the invention, a seat assembly is provided for supporting an occupant above a floor in an automotive vehicle. The seat assembly includes a seat cushion that is adapted to be pivotally coupled to the floor for movement between a raised position spaced above the floor and a lowered position adjacent the floor. The seat assembly also includes a seat back that is adapted to be pivotally coupled to the floor for movement between an upright position and a folded position overlying the seat cushion. Additionally, the seat assembly includes a drive link assembly operatively coupled between the seat back and the seat cushion for automatically moving the seat cushion between the raised and lowered positions in response to pivoting the seat back between the upright and folded positions thereby defining a seating position and a stowed position of the seat assembly.

The seat assembly also includes a passive locking mechanism. The passive locking mechanism is operatively coupled between the seat back and the seat cushion for locking the seat back and seat cushion together when the seat assembly is in the seating position.

In another embodiment of the invention, a seat assembly includes a seat cushion that is adapted to be pivotally coupled to a vehicle floor for movement between a raised position spaced above the floor and a lowered position adjacent the floor. The seat assembly also includes a seat back that is adapted to be pivotally coupled to the floor for movement between an upright position and a folded position overlying the seat cushion. The seat assembly further includes at least one drive link extending between a first end pivotally coupled to the seat back and a second end pivotally and slidably coupled to the seat cushion for automatically moving the seat cushion between the raised and lowered positions in response to pivoting the seat back between the upright and folded positions thereby defining a seating position and a stowed position of the seat assembly.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
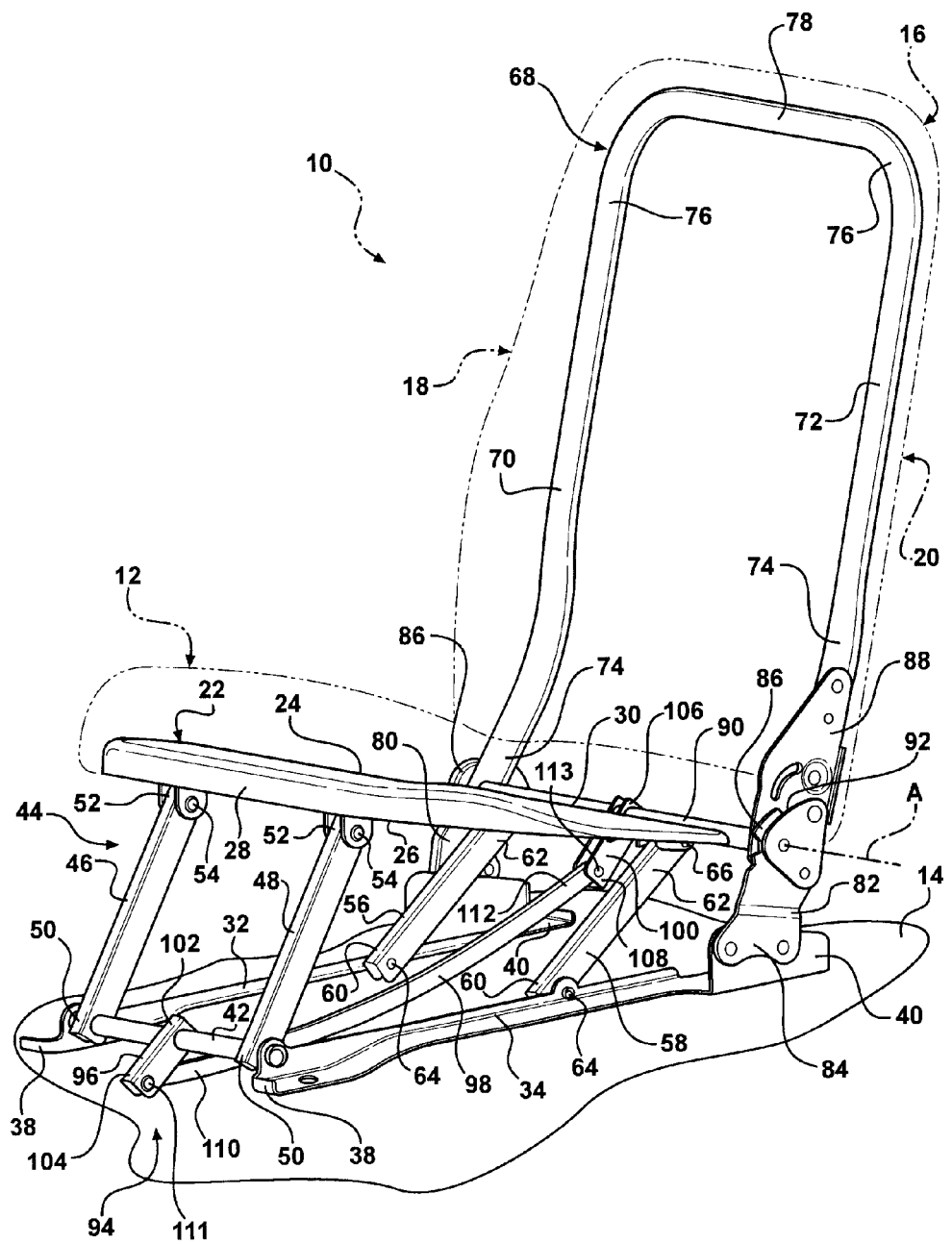
FIG. 1 is a front perspective view of a seat assembly in a seating position including a drive link assembly according to the invention.
Figure 2:
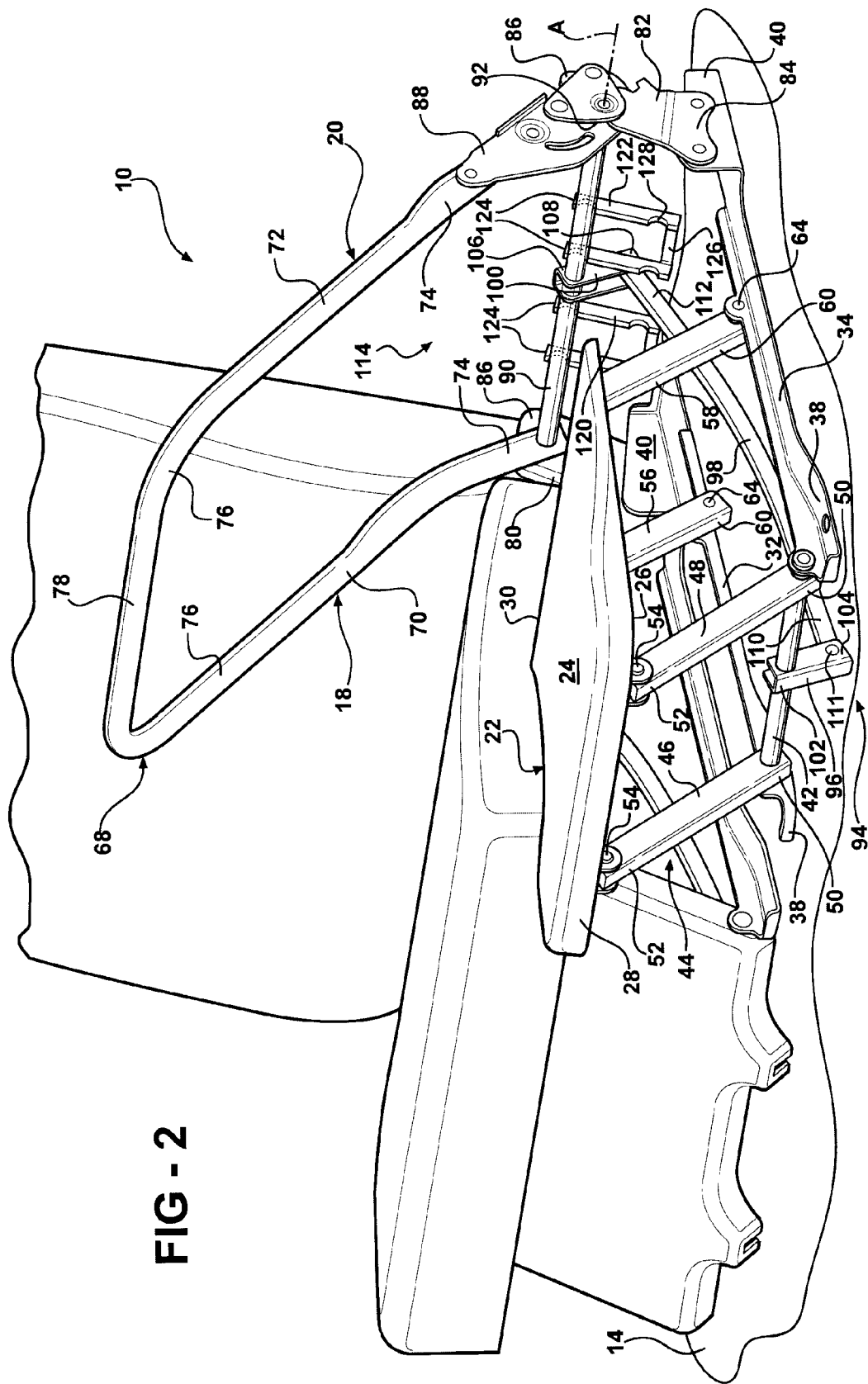
FIG. 2 is a front perspective view of the seat assembly in a partially stowed position.
Figure 3:
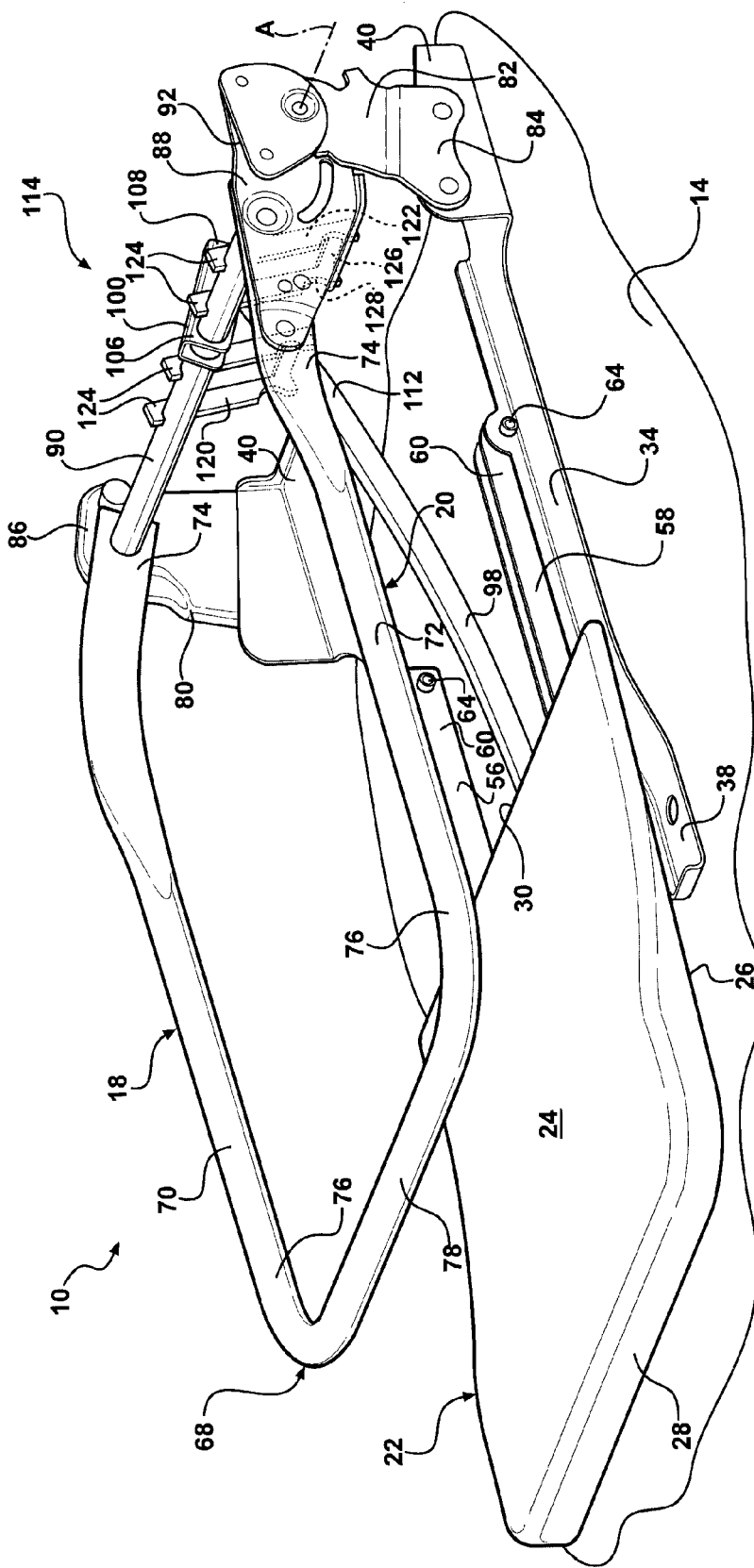
FIG. 3 is a front perspective view of the seat assembly in a stowed position.
Figure 4:
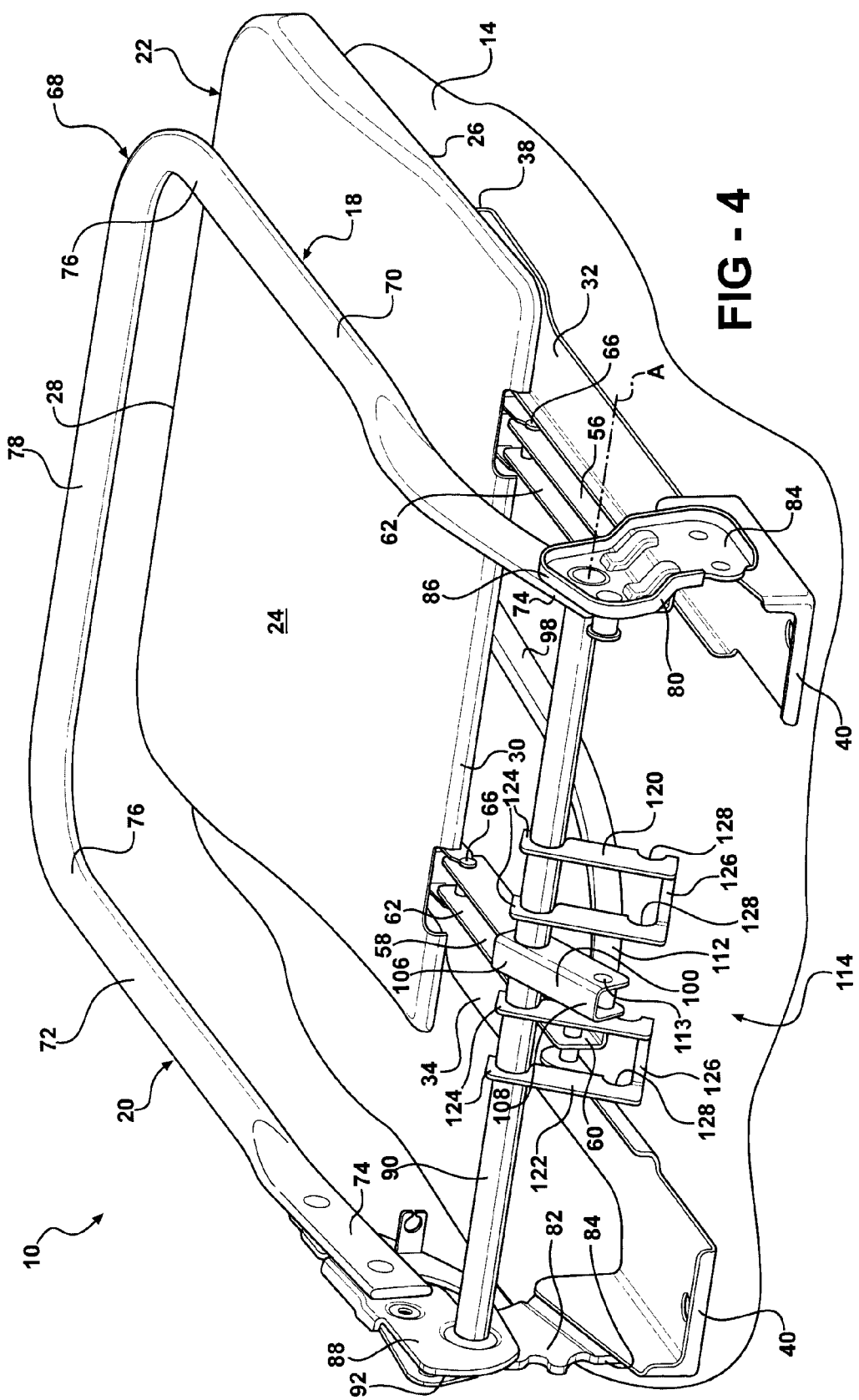
FIG. 4 is a rear perspective view of the seat assembly in the stowed position.

Referring to FIG. 1, a seat assembly for an automotive vehicle is generally shown at 10. The seat assembly 10 includes a generally horizontal seat cushion 12 for supporting a seat occupant above a floor 14 of the vehicle and a seat back 16 for supporting a back of the seat occupant. The seat assembly 10 extends laterally between an inboard side 18 and an outboard side 20. The seat back 16 is operatively coupled to the seat cushion 12 and pivots between a generally upright position, as shown in FIG. 1, and a folded position overlying the seat cushion 12, as shown in FIGS. 3 and 4. The seat assembly 10 is moveable between a seating position, as shown in FIG. 1, wherein the seat back 16 is in the upright position and the seat cushion 12 is in a raised position spaced above the floor 14, and a stowed position, as shown in FIGS. 3 and 4, wherein the seat back 16 is pivoted to the folded position and the seat cushion 12 is in a lowered position lying generally along the floor 14.

Referring to FIGS. 1 through 6, the seat cushion 12 includes a seat pan 22 having opposing top 24 and bottom 26 contoured surfaces. The seat pan 22 extends between a front end 28 and a rear end 30. Alternatively, it will be appreciated that the seat cushion 12 may include a perimeter frame assembly or other frame structure. As is well known in the vehicle seating art, the seat pan 22 or frame structure supports a resilient cellular foam pad encased in a decorative trim cover for added comfort and appearance.

Referring to FIG. 1, a pair of parallel and spaced apart elongated brackets 32, 34 is adapted to be mounted to the floor 14 by bolts or any other suitable method known to those skilled in the art. Each elongated bracket 32, 34 extends between a forward end 38 and a rearward end 40. A front cross tube 42 extends laterally between and is rotatably coupled to the respective forward end 38 of each elongated bracket 32, 34.

A riser mechanism, generally shown at 44, extends between the seat cushion 12 and the elongated brackets 32, 34 located along the floor 14. The riser mechanism 44 allows for movement of the seat cushion 12 between the raised position spaced above the floor 14 and the lowered position lying generally along the floor 14. The riser mechanism 44 includes a pair of parallel and spaced apart front legs 46, 48. Preferably, each front leg 46, 48 extends linearly between a lower end 50 and an upper end 52. The lower end 50 of each front leg 46, 48 is fixedly secured to the front cross tube 42. The upper end 52 of each front leg 46, 48 is pivotally coupled at pivot 54 to the seat pan 22, adjacent the front end 28 thereof.

A pair of parallel and spaced apart rear legs 56, 58 is positioned rearward of the respective front legs 46, 48. Preferably, each rear leg 56, 58 extends linearly between a lower end 60 and an upper end 62. The lower end 60 of each rear leg 56, 58 is pivotally coupled at pivot 64 to the respective elongated bracket 32, 34, between the forward 38 and rearward 40 ends. The upper end 62 of each rear leg 56, 58 is pivotally coupled at pivot 66 to the seat pan 22, adjacent the rear end 30 thereof.

The seat back 16 includes a seat back frame, generally indicated at 68. The seat back frame 68 includes a pair of spaced apart and generally parallel side members 70, 72. Each side member 70, 72 extends between a lower end 74 and an upper end 76. The seat back frame 68 also includes an upper cross member 78 extending between the upper ends 76 of the side members 70, 72. It is appreciated that the seat back 16 is similar to the seat cushion 12 in that the seat back frame 68 also supports a resilient cellular foam pad encased in a decorative trim cover for added comfort and appearance.

A pair of support brackets 80, 82 is provided for pivotally supporting the seat back 16. Each support bracket 80, 82 extends between a lower end 84 fixedly secured to the rearward end 40 of the respective elongated bracket 32, 34 and an upper end 86. It is appreciated that alternatively the support brackets 80, 82 could be formed integrally with the rearward end 40 of the respective elongated bracket 32, 34. In the embodiment shown, the lower end 74 of the side member 70 on the inboard side 18 of the seat back 16 is pivotally coupled to the upper end 86 of the support bracket 80. The lower end 74 of the side member 72 on the outboard side 20 of the seat back 16 is fixedly secured to a seat back bracket 88 which in turn is pivotally coupled to the upper end 86 of the support bracket 82. A rear cross tube 90 extends laterally between the inboard 18 and outboard 20 sides of the seat back 16 defining an axis A about which the seat back 16 pivots. On the inboard side 18, the rear cross tube 90 is fixedly secured to the lower end 74 of the side member 70. On the outboard side 20, the rear cross tube 90 is fixedly secured to the seat back bracket 88.

A latch mechanism 92, of any suitable type commonly known in the art, is provided for controlling pivotal movement of the seat back 20 between the upright position and the folded position. The latch mechanism 92 is disposed between the seat back bracket 88 and the support bracket 82 on the outboard side 20 of the seat assembly 10. The latch mechanism 92 is operable between a locked state and an unlocked state by actuating a release handle (not shown). In the locked state, the latch mechanism 92 maintains the seat back 16 in the upright position. In the unlocked state, the latch mechanism 92 is released to allow the seat back 16 to pivot between the upright position and the folded position. It will be appreciated that once the seat back 16 is in the folded position the latch mechanism 92 may return to the locked state to maintain the seat back 16 in the folded position.

A drive link assembly, generally shown at 94, is operatively coupled between the seat back 16 and the seat cushion 12 for automatically moving the seat cushion 12 between the raised and lowered positions in response to pivotal movement of the seat back 16 between the upright and folded positions. More specifically, the drive link assembly 94 includes a front link 96, a drive link 98, and a rear link 100. The front link 96 extends linearly between a proximal end 102 fixedly secured to the middle of the front cross tube 42 and an opposite distal end 104. The rear link 100 extends linearly between a proximal end 106 fixedly secured to the middle of the rear cross tube 90 and an opposite distal end 108. The drive link 98 extends between a first end 110 and a second end 112. Preferably, the drive link 98 has a curvature or bend between the first 110 and second 112 ends. The first end 110 of the drive link 98 is pivotally coupled to the distal end 104 of the front link 96 at pivot 111 and the second end 112 is pivotally coupled to the distal end 108 of the rear link 100 at pivot 113.

Figure 5:
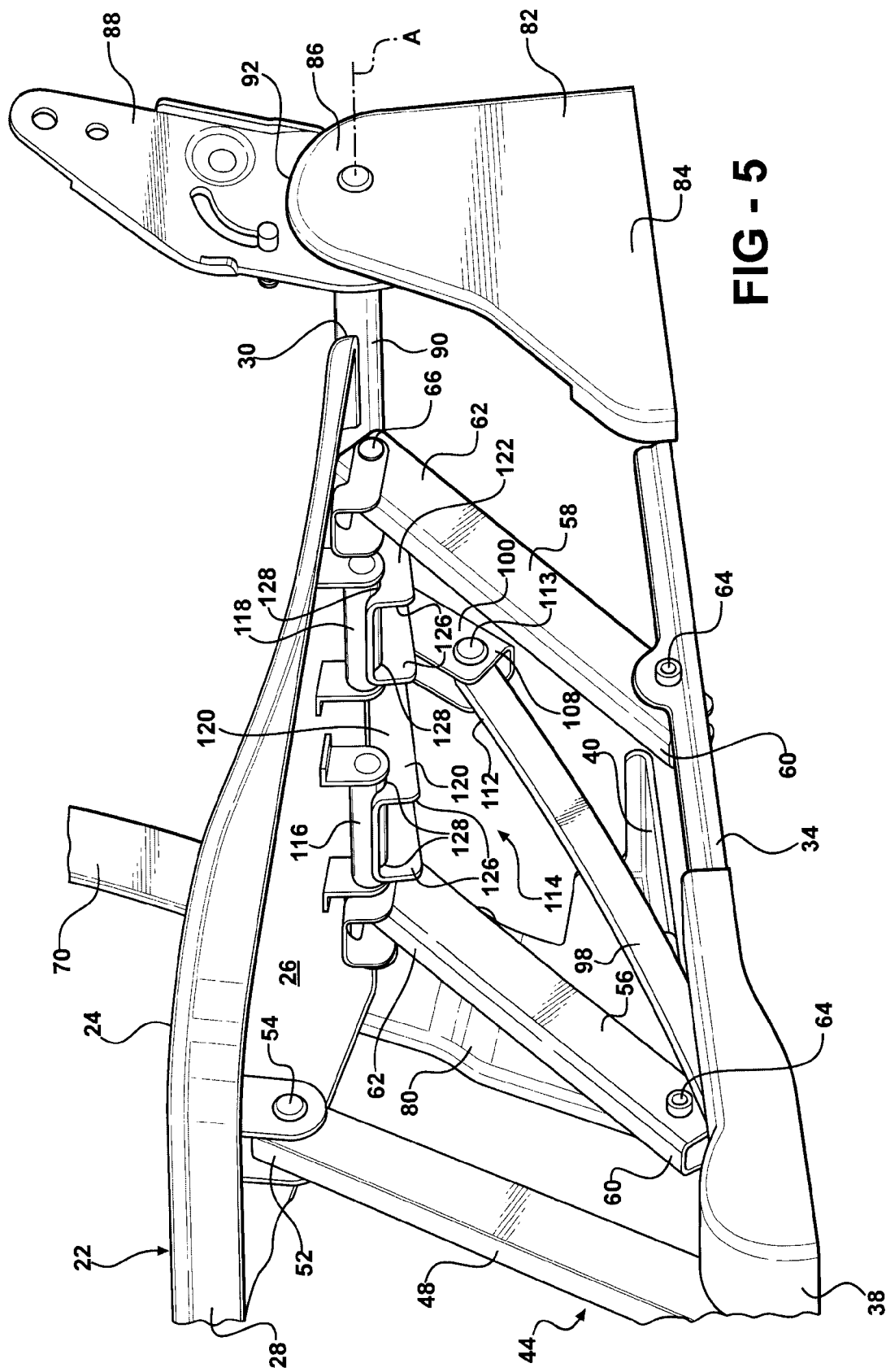
FIG. 5 is a fragmentary, front perspective view of the seat assembly in the seating position illustrating a passive locking mechanism.
Figure 6:
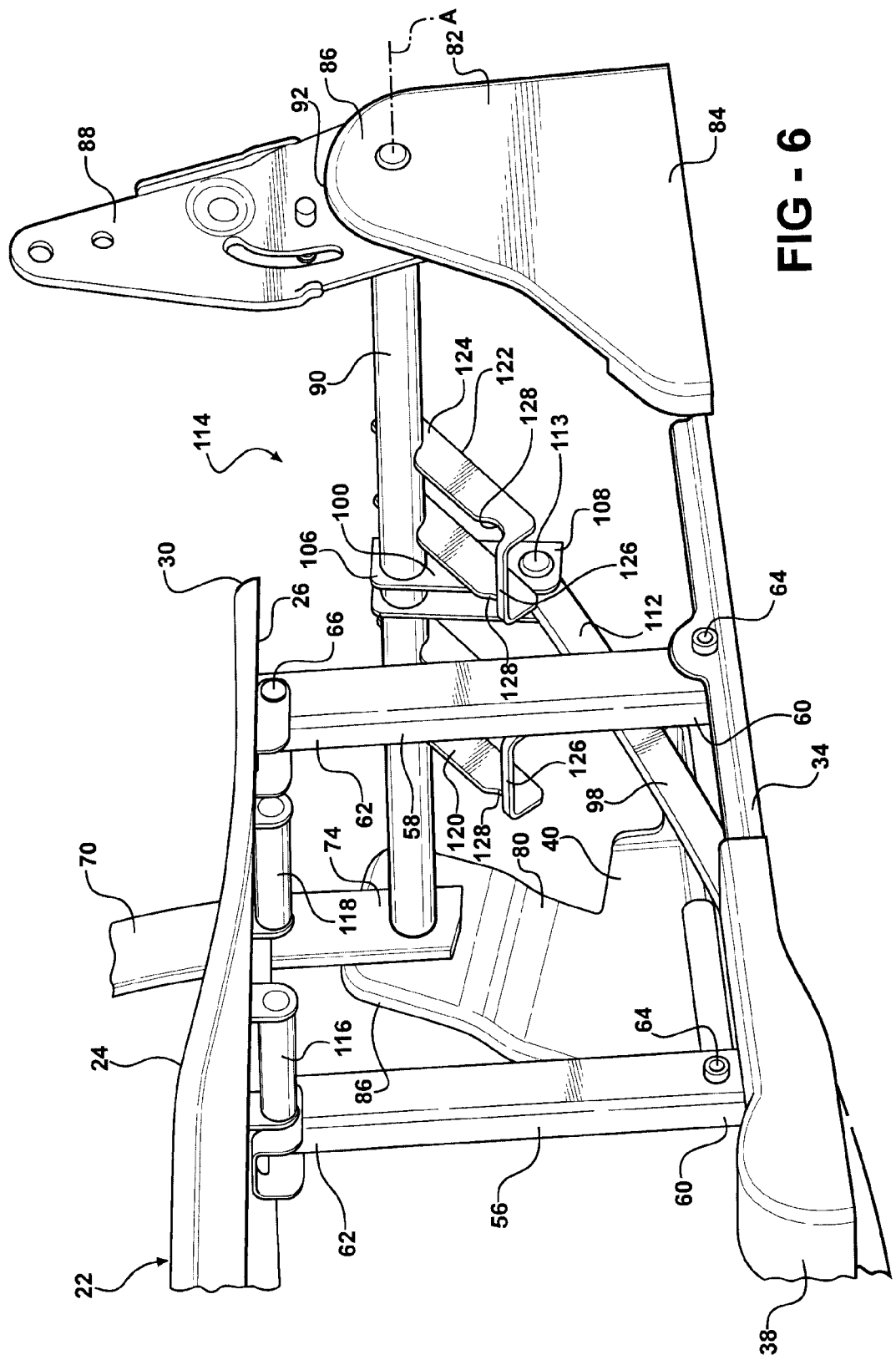
FIG. 6 is a fragmentary, front perspective view of the seat assembly in the partially stowed position illustrating the passive locking mechanism.

Referring to FIGS. 2 through 6, the seat assembly 10 also includes a passive locking mechanism, generally shown at 114, for locking the lower end of the seat back 16 and the rear end of the seat cushion 12 together when the seat assembly 10 is in the seating position. Locking the seat back 16 and seat cushion 12 together improves the forward load carrying ability of the seat assembly 10. The passive locking mechanism 114 includes a pair of tube sections 116, 118 mounted to the bottom surface 26 of the seat pan 22, adjacent the rear end 30 thereof, as shown in FIGS. 5 and 6. The passive locking mechanism 114 also includes a pair of clasp members 120, 122 extending between a proximal end 124 and a free distal end 126. The proximal end 124 of each clasp member 120, 122 is fixedly secured to the rear cross tube 90. The distal end 126 of each clasp member 120, 122 includes a groove 128 for lockingly engaging one of the respective tube sections 116, 118 when the seat assembly 10 is in the seating position, as shown in FIG. 5. The groove 128 at the distal end 126 of each clasp member 120, 122 is released from the respective tube section 116, 118 when the seat assembly 10 is in the stowed position, as shown in FIGS. 3 and 4. While the passive locking mechanism 114 shown in the current embodiment includes the pair of tube sections 116, 118 and the pair of clasp members 120, 122, it is appreciated that one tube section and one clasp member could be used without varying from the scope of the invention.

In operation, starting with the seat assembly 10 in the seating position, the seat cushion 12 is supported above the floor 14 in the raised position by the front 46, 48 and rear 56, 58 legs. The seat back 16 is supported in the upright position by the support brackets 80, 82. To move the seat assembly 10 from the seating position to the stowed position, the latch mechanism 92 is released to the unlocked state by actuating the release handle to allow the seat back 16 to pivot forwardly about the axis A toward the folded position overlying the seat cushion 12. As the seat back 16 pivots forwardly, the rear cross tube 90 rotates in a counterclockwise direction (when viewed from FIG. 1) causing each clasp member 120, 122 to rotate about its proximal end 124 such that the groove 128 at the distal end 126 releases from the respective tube section 116, 118. At the same time, the counterclockwise rotation of the rear cross tube 90 causes the rear link 100 to rotate in the counterclockwise direction, thereby pulling the drive link 98 rearward. The rearward movement of the drive link 98 urges the front link 96 to rotate in the counterclockwise direction causing the front cross tube 42 to rotate in the counterclockwise direction. The counterclockwise rotation of the front cross tube 42 causes the front legs 46, 48 to pivot forwardly about the lower ends 50. The pivotal movement of the front legs 46, 48 moves the upper ends 52 forwardly and downwardly which simultaneously causes the rear legs 56, 58 to pivot forwardly about pivots 64. The pivotal movement of the front 46, 48 and rear 56, 58 legs moves the seat pan 22, and thus the seat cushion 12, forwardly and downwardly toward the floor 14 of the vehicle. Thus, in response to pivotal movement of the seat back 16 from the upright position to the folded position, the drive link assembly 94 automatically moves the seat cushion 12 forwardly and downwardly until the seat cushion 12 is lying generally along the floor 14 of the vehicle and the seat assembly 10 is in the stowed position.

To return the seat assembly 10 to the seating position, the latch mechanism 92 is released to the unlocked state by actuating the release handle to allow the seat back 16 to pivot rearwardly about the axis A toward the upright position. As the seat back 16 pivots rearwardly, the rear cross tube 90 rotates in a clockwise direction (when viewed from FIG. 3) causing the rear link 100 to also rotate in the clockwise direction, thereby pushing the drive link 98 forward. The forward movement of the drive link 98 urges the front link 96 to rotate in the clockwise direction causing the front cross tube 42 to rotate in the clockwise direction. The clockwise rotation of the front cross tube 42 causes the front legs 46, 48 to pivot rearwardly about the respective lower ends 50. The pivotal movement of the front legs 46, 48 moves the upper ends 52 upwardly and rearwardly which simultaneously causes the rear legs 56, 58 to pivot rearwardly about pivots 64. The pivotal movement of the front 46, 48 and rear 56, 58 legs moves the seat pan 22, and thus the seat cushion 12, upwardly and rearwardly toward the raised position spaced above the floor 14 of the vehicle. At the same time, the clockwise rotation of the rear cross tube 90 causes each clasp member 120, 122 to rotate about its proximal end 124 such that the groove 128 at the distal end 126 lockingly engages the respective tube section 116, 118. Thus, in response to pivotal movement of the seat back 16 from the folded position to the upright position, the drive link assembly 94 automatically moves the seat cushion 12 upwardly and rearwardly until the seat cushion 12 is in the raised position spaced above the floor 14 of the vehicle and the seat assembly 10 is in the seating position.

Figure 7:
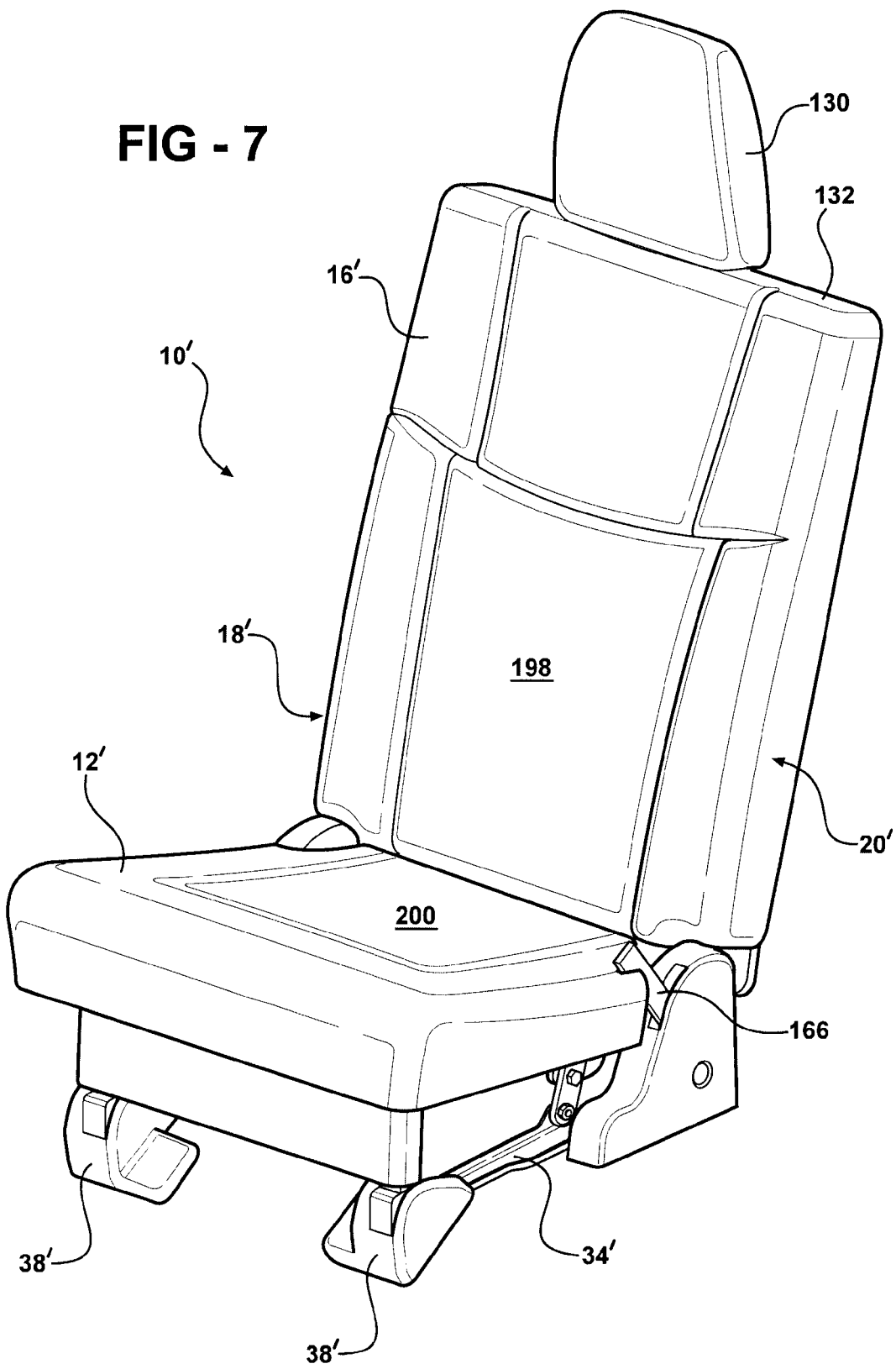
FIG. 7 is a front perspective view of a seat assembly in a seating position according to a second embodiment of the invention.
Figure 8:
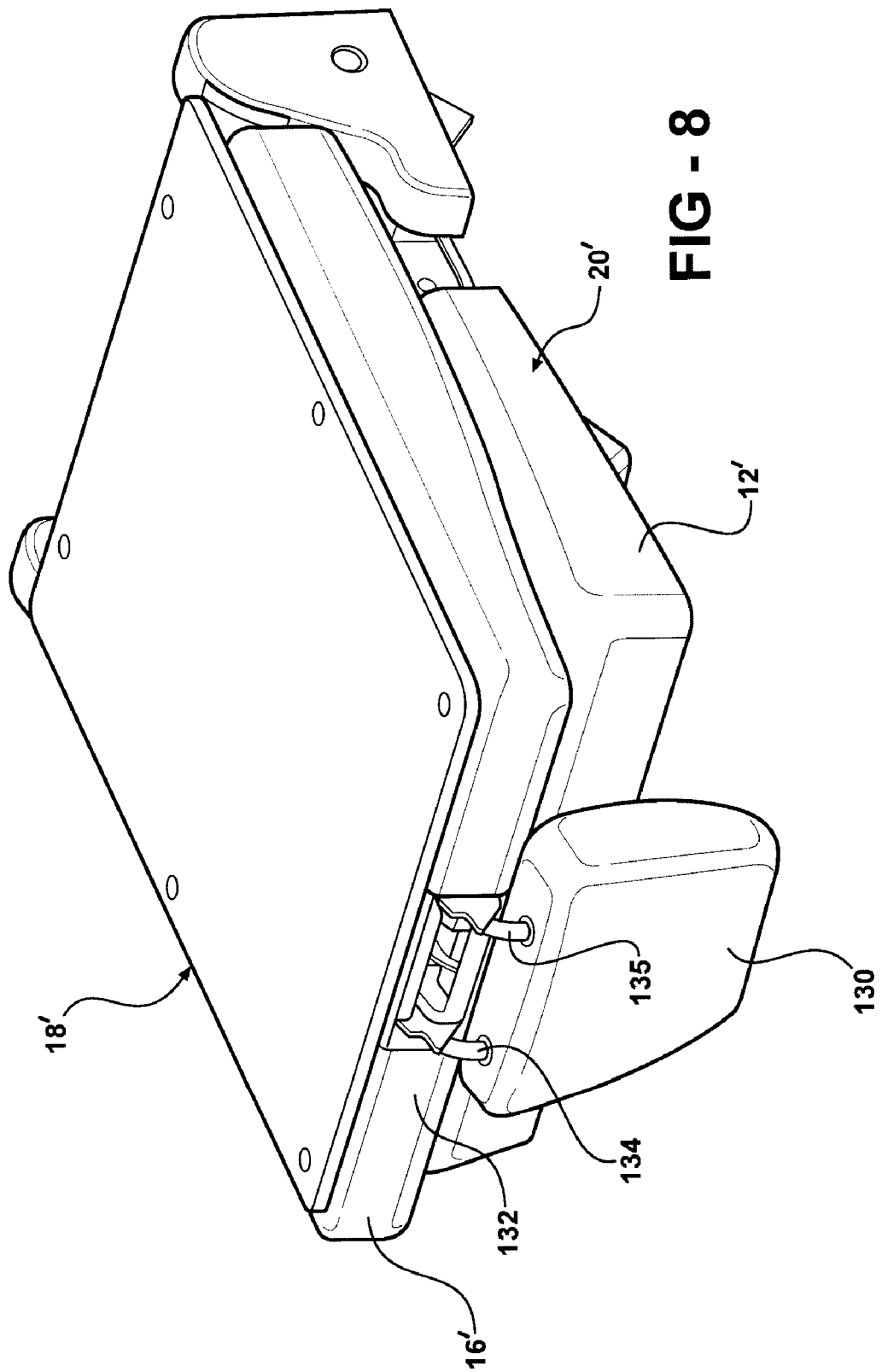
FIG. 8 is a front perspective view of the seat assembly of FIG. 7 in a stowed position.
Figure 9:
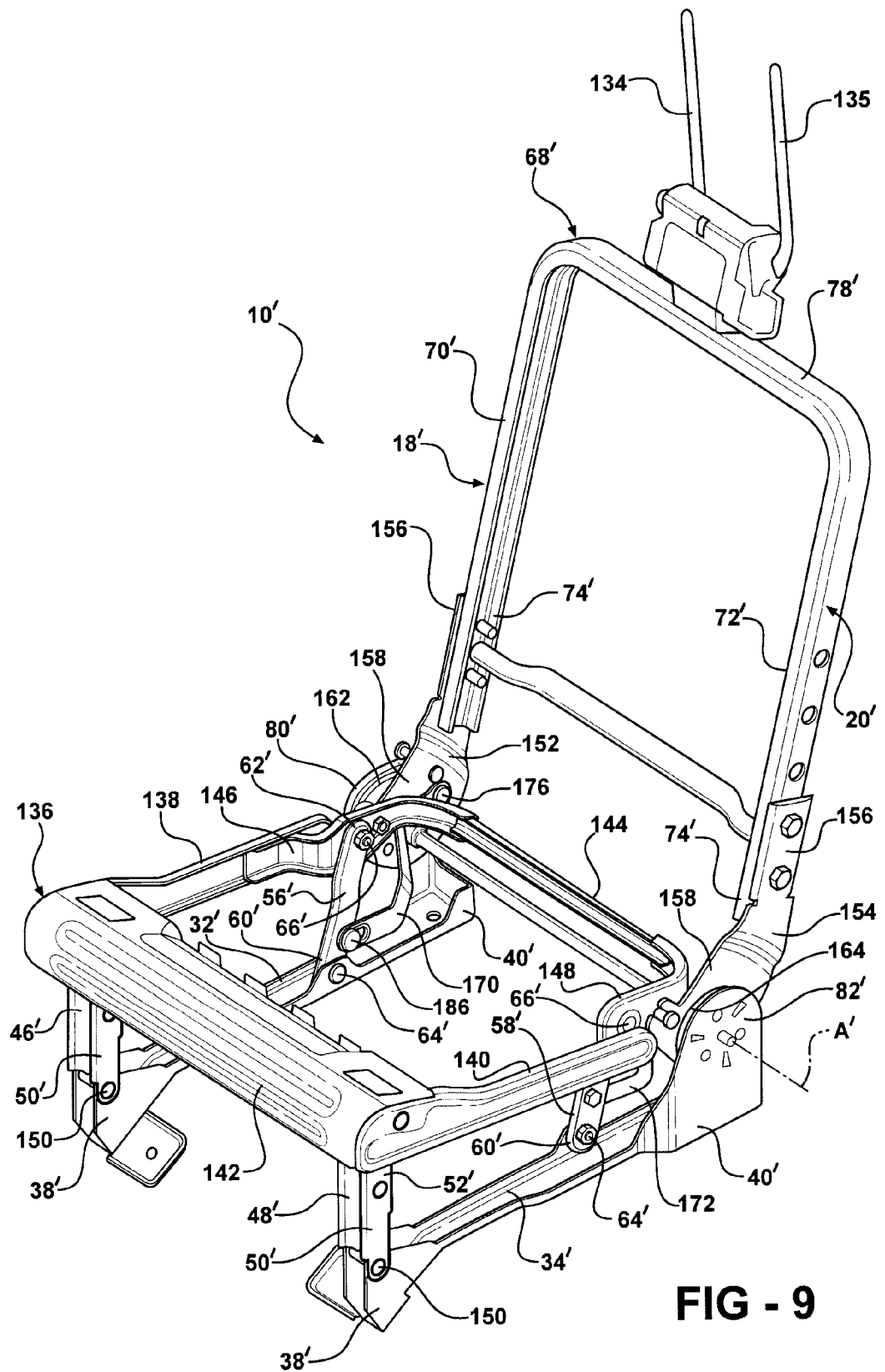
FIG. 9 is a front perspective view of the seat assembly in the seating position including a pair of drive links.
Figure 10:
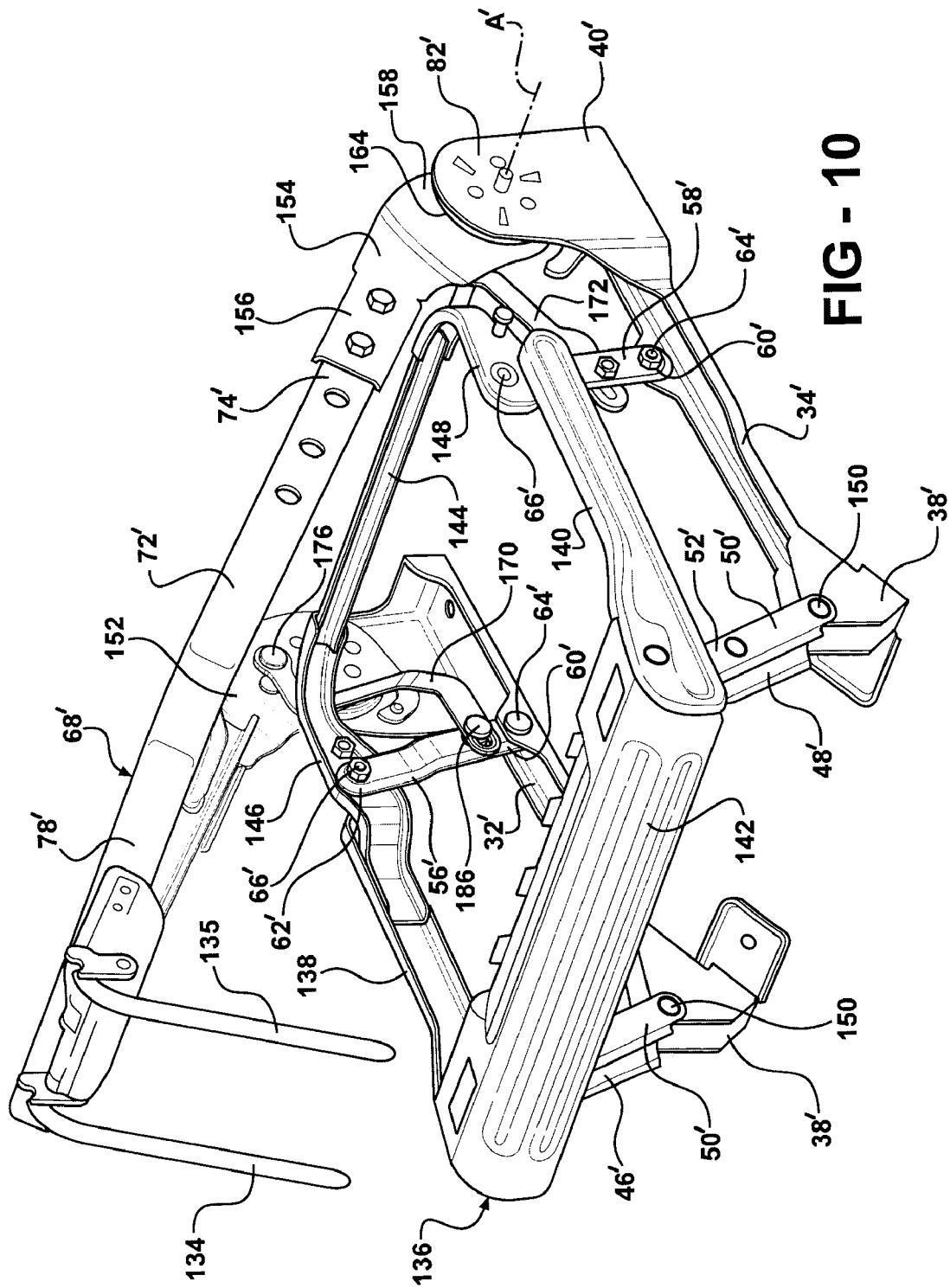
FIG. 10 is a front perspective view of the seat assembly of FIG. 9 in a partially stowed position.
Figure 11:
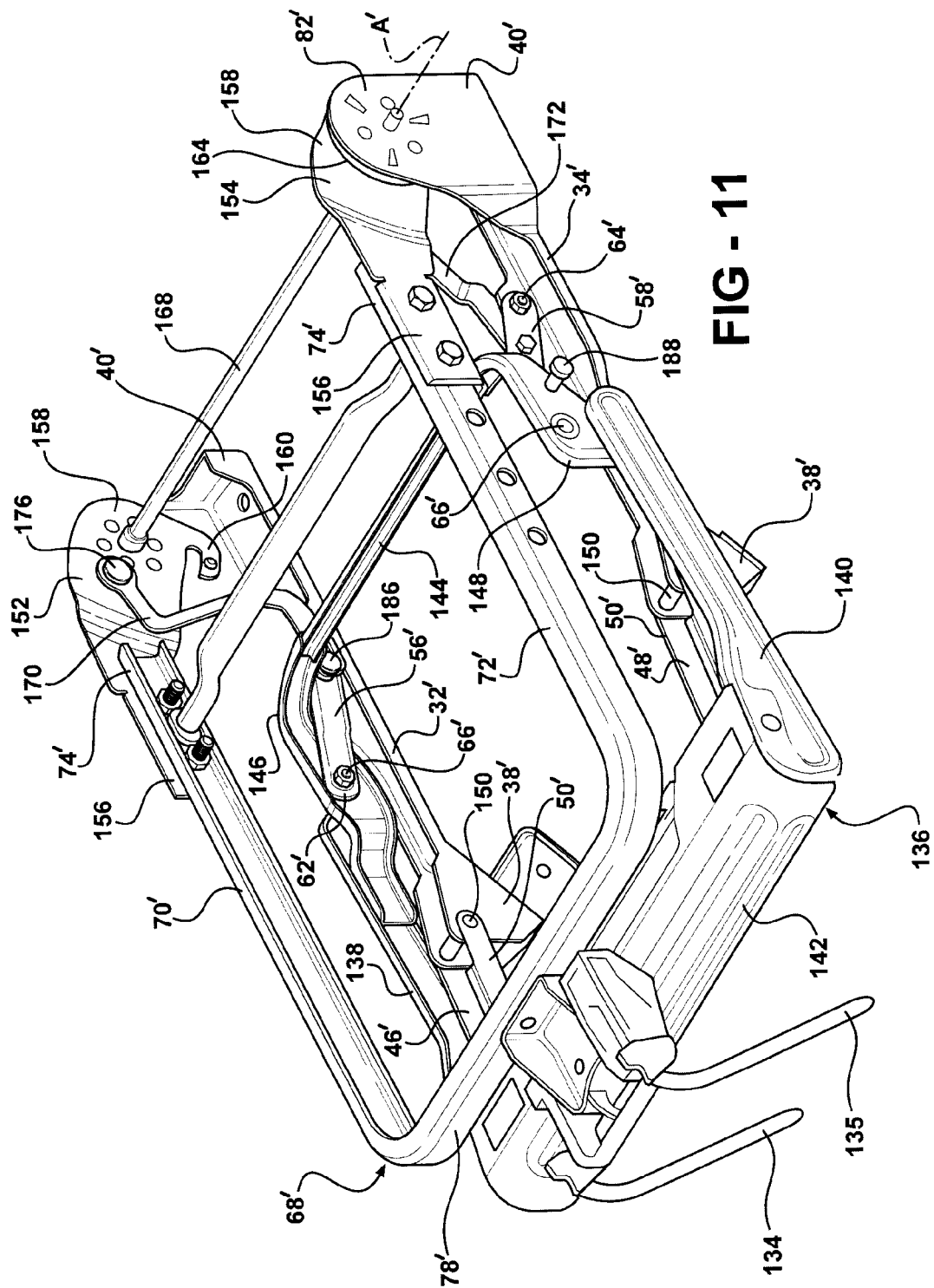
FIG. 11 is a front perspective view of the seat assembly of FIG. 9 in the stowed position.

Referring to FIGS. 7 through 15, a second embodiment of the invention is disclosed wherein like primed reference numerals represent similar elements as those described above. In the second embodiment, the seat assembly 10' includes a headrest 130 disposed at an upper end 132 of the seat back 16'. As shown in FIGS. 9 through 11, the headrest 130 is internally supported by a pair of headrest posts 134, 135 that are pivotally coupled to the upper cross member 78' of the seat back frame 68'. The headrest 130 pivots between a use position extending longitudinally with the seat back 16', as shown in FIG. 7, and a stowed position, generally perpendicular to the seat back 16', as shown in FIG. 8. A cable assembly (not shown), as is well known in the art, is provided for automatically actuating the headrest 130 from the use position to the stowed position in response to pivoting the seat back 16' from the upright position to the folded position.

Referring to FIGS. 9 through 11, a perimeter seat cushion frame 136 is disposed within and rigidly supports the seat cushion 12'. The seat cushion frame 136 includes a pair of generally parallel side members 138, 140. The side members 138, 140 are spaced apart by a front member 142 and a rear member 144 extending therebetween. The seat cushion frame 136 also includes intermediate members 146, 148 adapted for connecting the rear member 144 with each respective side member 138, 140. It is appreciated, however, that the intermediate members 146, 148 could be integrally formed with the respective side members 138, 140 without varying from the scope of the invention.

The pair of elongated brackets 32', 34' extends between forward ends 38' and rearward ends 40'. Each support bracket 80', 82' is integrally formed at the rearward end 40' of the respective elongated bracket 32', 34'.

The lower end 50' of each front leg 46', 48' is pivotally coupled at pivot 150 to the forward end 38' of the respective elongated bracket 32', 34'. The upper end 52' of each front leg 46', 48' is pivotally coupled to the front member 142 of the seat cushion frame 136.

The lower end 60' of each rear leg 56', 58' is pivotally coupled at pivot 64' to the respective elongated bracket 32', 34', between the forward 38' and rearward 40' ends. The upper end 62' of each rear leg 56', 58' is pivotally coupled at pivot 66' to the respective intermediate member 146, 148 of the seat cushion frame 136.

A pair of seat back brackets 152, 154 is provided for pivotally coupling the seat back 16' to the support brackets 80', 82'. More specifically, each seat back bracket 152, 154 extends between an upper end 156 fixedly secured to the lower end 74' of the respective side member 70', 72' of the seat back frame 68' and a lower end 158 pivotally coupled to the respective support bracket 80', 82'. The pivotal connection between the seat back brackets 152, 154 and the support brackets 80', 82' defines the axis A' about which the seat back 16' pivots. The lower end 158 of each seat back bracket 152, 154 defines an open slot or hook 160, the purpose of which is described in detail below. It is appreciated that the seat back brackets 152, 154 may be integrally formed as part of the seat back frame 68' without varying from the scope of the invention.

A pair of recliner mechanisms 162, 164, of any suitable type commonly known in the art, is provided for controlling pivotal movement of the seat back 16' about the axis A' between the upright position and the folded position. The recliner mechanisms 162, 164 also allow the seat back 16' to recline about the axis A'. Each recliner mechanism 162, 164 is disposed between one of the seat back brackets 152, 154 and the respective support bracket 80', 82'. The recliner mechanisms 162, 164 are operable between a locked state and an unlocked state by actuating a release handle 166 mounted on the outboard side 20' of the seat assembly 10', as shown in FIG. 7. The recliner mechanisms 162, 164 are operatively coupled together by a cross-talk tube 168 extending therebetween such that actuating the release handle 166 will actuate the recliner mechanisms 162, 164 between the locked and unlocked states simultaneously. In the locked state, the recliner mechanisms 162, 164 maintain the seat back 16' in the upright position. In the unlocked state, the seat back 16' can pivot between the upright and folded positions. It will be appreciated that once the seat back 16' is in the folded position, the recliner mechanisms 162, 164 may return to the locked state to maintain the seat back 16' in the folded position. Alternatively, in the unlocked state, the seat back 16' can be reclined for occupant comfort.

Figure 12:
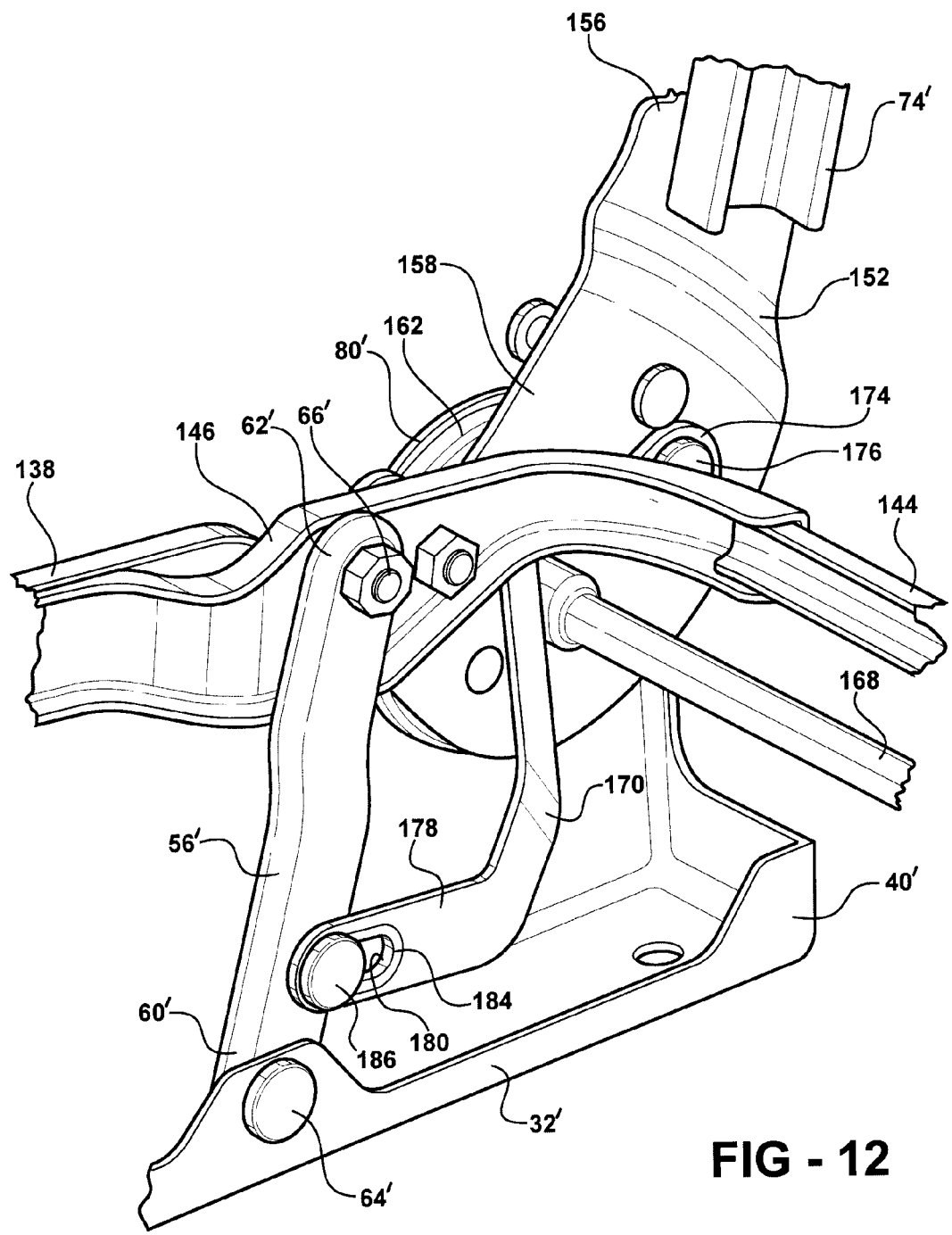
FIG. 12 is a fragmentary, enlarged view of the seat assembly of FIG. 9 illustrating one of the drive links.
Figure 13:
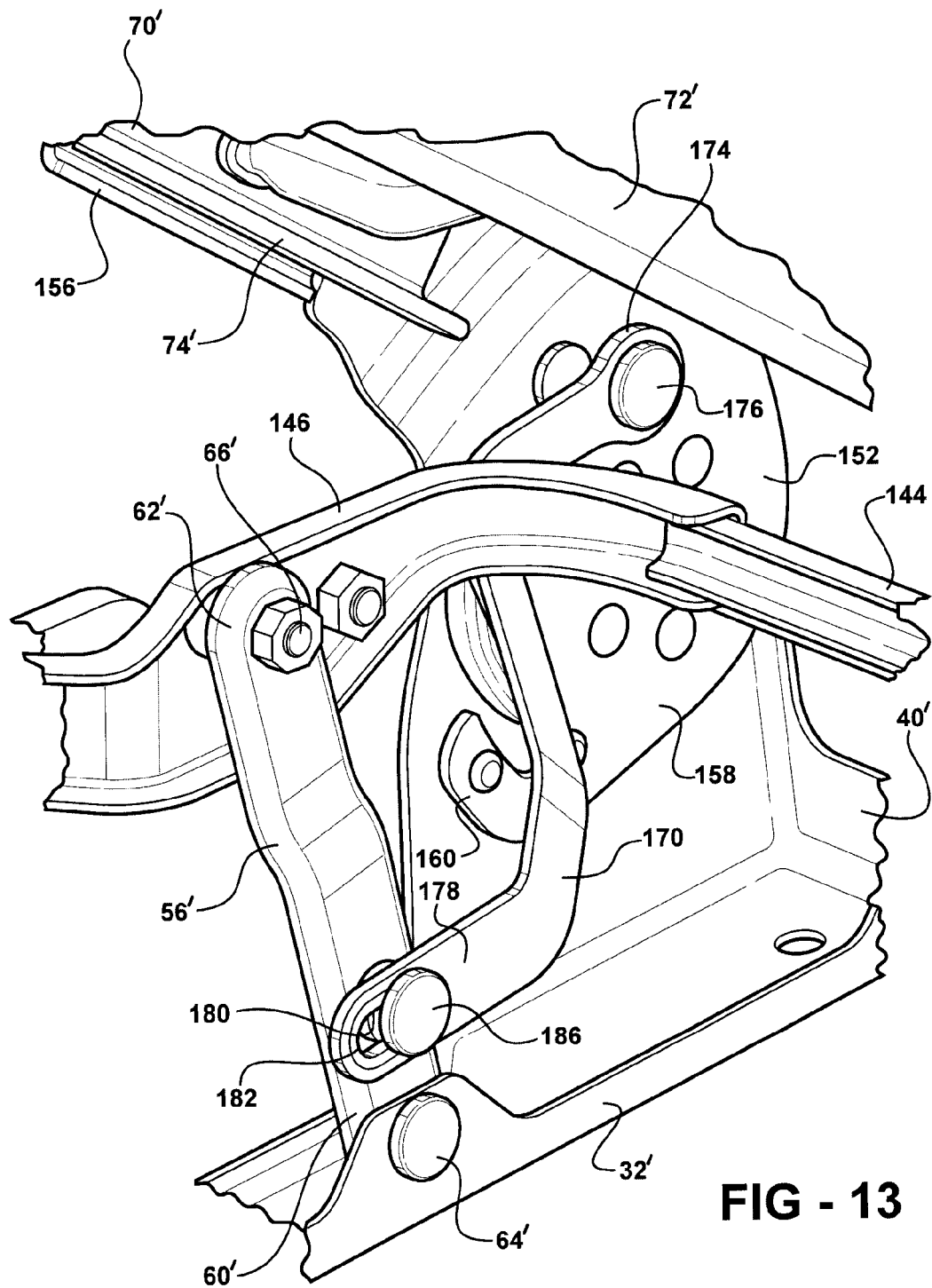
FIG. 13 is a fragmentary, enlarged view of the seat assembly of FIG. 10 illustrating one of the drive links.
Figure 14:
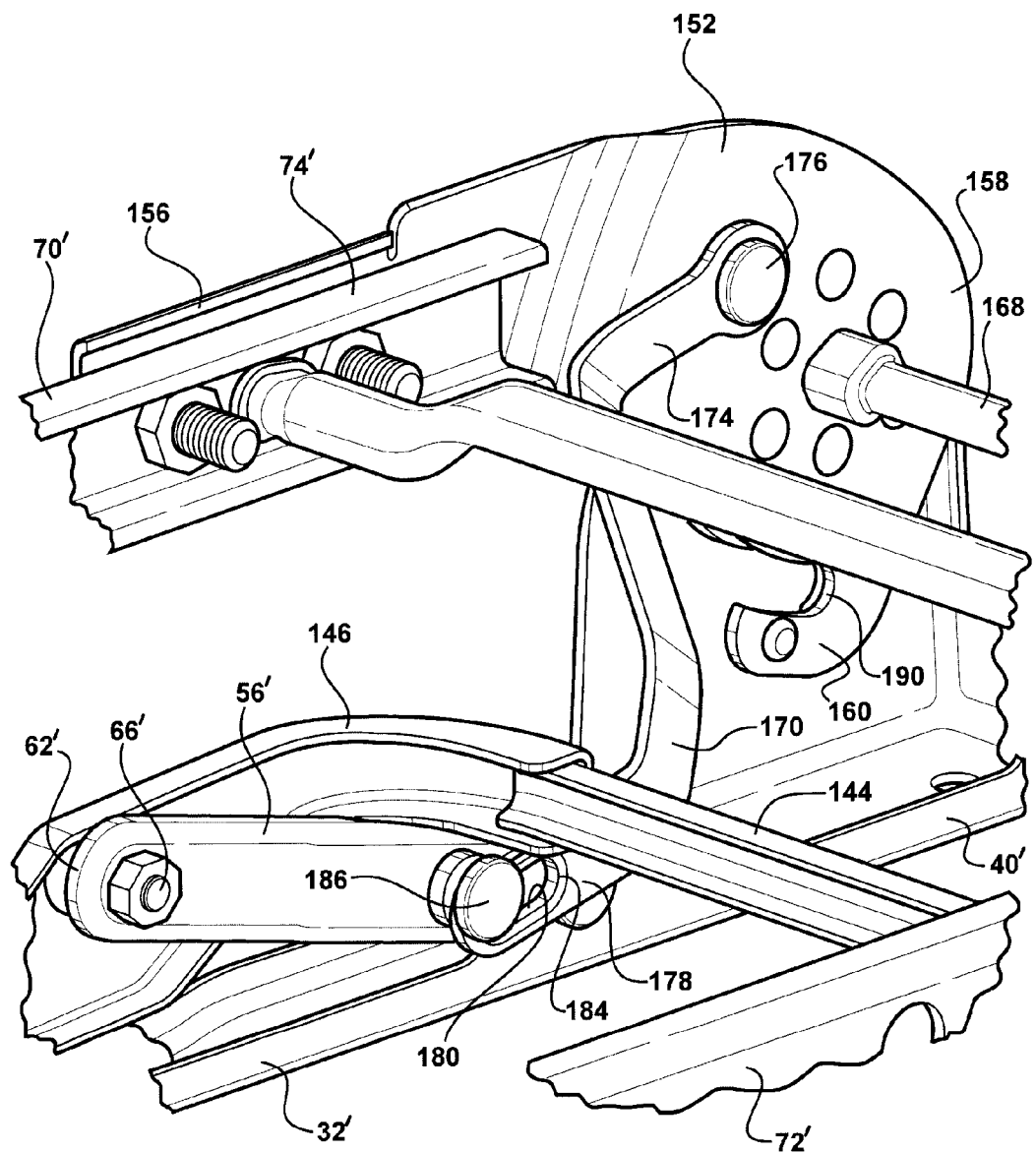
FIG. 14 is a fragmentary, enlarged view of the seat assembly of FIG. 11 illustrating one of the drive links.

A pair of S-shaped drive links 170, 172 is operatively coupled between the seat back 16' and the seat cushion 12' for automatically moving the seat cushion 12' between the raised and lowered positions in response to pivotal movement of the seat back 16' between the upright and folded positions. Referring to FIGS. 12 through 14, a first end 174 of each drive link 170, 172 is pivotally coupled at pivot 176 to the respective seat back bracket 152, 154. A second end 178 of each drive link 170, 172 is pivotally and slidably coupled to the respective rear leg 56', 58'. More specifically, the second end 178 of each drive link 170, 172 includes a slot 180 extending between a first end 182 and a second end 184. A pin 186 is fixedly secured to each rear leg 56', 58', between the lower 60' and upper 62' ends, and extends laterally inward therefrom. Each pin 186 is pivotally and slidably disposed in the slot 180 of one of the drive links 170, 172. When the seat back 16' is in the upright position, the pins 186 are disposed at the first end 182 of the slots 180, as shown in FIG. 12. When the seat back 16' is in the folded position, the pins 186 are also disposed at the first end 182 of the slots 180, as shown in FIG. 14.

Figure 15:
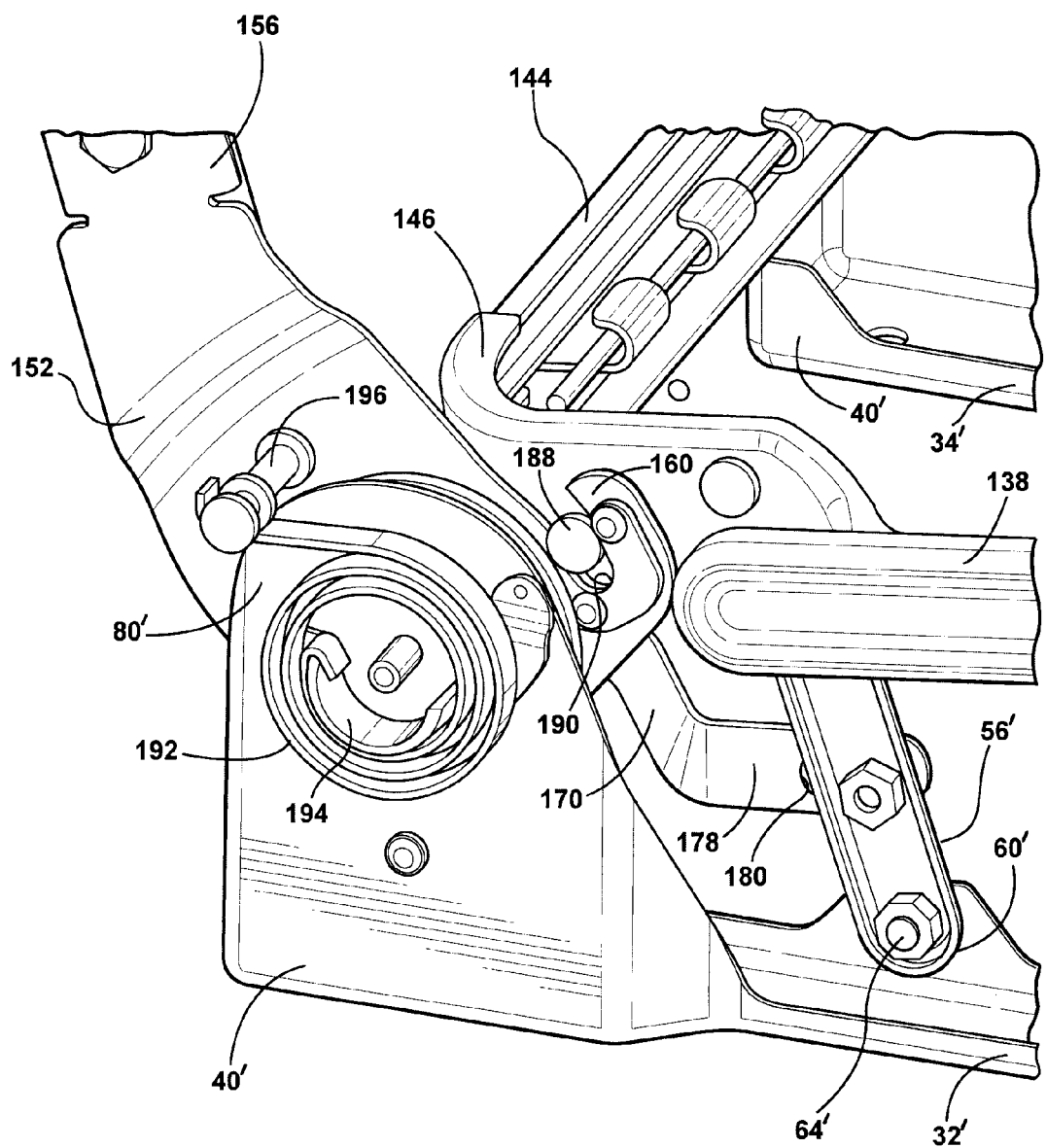
FIG. 15 is a fragmentary, enlarged view of the seat assembly of FIG. 9 illustrating a hook and striker in an engaged position.

Referring to FIG. 15, a striker post 188 (only one shown) is fixedly secured to each intermediate member 146, 148 and extends laterally outward therefrom. When the seat back 16' is in the upright position, the hook 160 at the lower end 158 of each seat back bracket 152, 154 engages the respective striker post 188 to provide added stability to the seat cushion 12' in the raised position. The seat back 16' may recline a limited amount until a closed end 190 of the hook 160 abuts the striker post 188, thereby preventing the seat back 16' from reclining any farther.

A torsion spring 192 is provided for biasing the seat back 16' toward the folded position. The torsion spring 192 extends between a tab 194 fixedly secured to the support bracket 80' and a post 196 fixedly secured to the seat back bracket 152.

In operation, starting with the seat assembly 10' in the seating position, the seat cushion 12' is supported above the floor 14' in the raised position by the front 46', 48' and rear 56', 58' legs. The seat back 16' is supported in the upright position by the support brackets 80', 82'. Additionally, the headrest 130 is supported in the use position by the headrest posts 134, 135. To move the seat assembly 10' from the seating position to the stowed position, the recliner mechanisms 162, 164 are released to the unlocked state by actuating the release handle 166. With the recliner mechanisms 162, 164 in the unlocked state, the headrest 130 pivots forward into the stowed position and the seat back 16' is free to pivot forwardly about the axis A' toward the folded position overlying the seat cushion 16'. As the seat back 16' pivots forwardly, the seat back brackets 152, 154 urge the drive links 170, 172 forward. Initially, the drive links 170, 172 do not exert any force on the pins 186 as the slots 180 allow the drive links 170, 172 to move relative to the pins 186. In other words, the pins 186 slide within the slots 180 from the first end 182 to the second end 184. This lost motion connection between the drive links 170, 172 and rear legs 56', 58' allows the seat back 16' to pivot forwardly without any corresponding movement of the seat cushion 12' to allow time for the hooks 160 to disengage from the striker posts 188. When the hooks 160 are disengaged from the striker posts 188, the second end 184 of the slots 180 is engaged with the pins 186, which causes the drive links 170, 172 to urge the rear legs 56', 58' to pivot forwardly about the pivots 64'. The pivotal movement of the rear legs 56', 58' moves the seat cushion 12' forwardly and downwardly which simultaneously causes the front legs 46', 48' to pivot forwardly about pivots 150. The pivotal movement of the front 46', 48' and rear 56', 58' legs moves the seat cushion 12' forwardly and downwardly toward the floor 14'. Once the seat cushion 12' is adjacent to the floor 14', a back supporting surface 198 of the seat back 16' engages a seating surface 200 of the seat cushion 12', both shown in FIG. 1, and pushes the seat cushion 12' farther downward into the lowered position. This additional downward push by the seat back 16' rather than the drive links 170, 172 causes the front 46', 48' and rear 56', 58' legs to pivot an additional amount such that the pins 186 bottom out against the first end 182 of the slots 180, as shown in FIG. 14. Thus, in response to pivotal movement of the seat back 16' from the upright position to the folded position, the drive links 170, 172 automatically move the seat cushion 12' forwardly and downwardly until the seat cushion 12' is lying generally along the floor 14' of the vehicle and the seat assembly 10' is in the stowed position.

To return the seat assembly 10' to the seating position, the recliner mechanisms 162, 164 are released to the unlocked state by actuating the release handle 166 to allow the seat back 16' to pivot rearwardly about the axis A' toward the upright position. As the seat back 16' pivots rearwardly, the seat back brackets 152, 154 urge the drive links 170, 172 rearward and because the first end 182 of the slots 180 is engaged with the pins 186, the drive links 170, 172 urge the rear legs 56', 58' to pivot rearwardly about the pivots 64'. The pivotal movement of the rear legs 56', 58' moves the seat cushion 12' upwardly and rearwardly which simultaneously causes the front legs 46', 48' to pivot rearwardly about pivots 150. The pivotal movement of the front 46', 48' and rear 56', 58' legs moves the seat cushion 12' upwardly and rearwardly toward the raised position. As the seat cushion 12' approaches the raised position and the seat back 16' approaches the upright position, the hooks 160 engage the striker posts 188. Thus, in response to pivotal movement of the seat back 16' from the folded position to the upright position, the drive links 170, 172 automatically move the seat cushion 12' upwardly and rearwardly until the seat cushion 12' is spaced above the floor 14' of the vehicle and the seat assembly 10' is in the seating position. The headrest 130 is then manually returned to the use position.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A seat assembly for supporting an occupant above a floor in an automotive vehicle, said seat assembly comprising:

a seat cushion adapted to be pivotally coupled to the floor for movement between a raised position at least partially spaced above the floor and a lowered position adjacent the floor;

a seat back adapted to be pivotally coupled to the floor for movement between an upright position and a folded position overlying said seat cushion; and a drive link assembly operatively coupled between said seat back and said seat cushion for automatically moving said seat cushion between said raised and lowered positions in response to pivoting said seat back between said upright and folded positions thereby defining a seating position and a stowed position of said seat assembly, said drive link assembly including a front link, a drive link, and a rear link, said front link operatively coupled at a first end to said seat cushion and pivotally coupled at a second end to a first end of said drive link, and said rear link operatively coupled at a first end to said seat back and pivotally coupled at a second end to a second end of said drive link.

2. A seat assembly as set forth in claim 1 wherein said seat back includes a seat back frame pivotally coupled at a lower end to a support bracket adapted to be fixedly secured to the floor.

3. A seat assembly as set forth in claim 2 including a riser mechanism for allowing movement of said seat cushion between said raised and lowered positions, said riser mechanism including a front leg pivotally coupled between said seat cushion and the floor and a rear leg disposed rearward of said front leg, said rear leg pivotally coupled between said seat cushion and the floor.

4. A seat assembly as set forth in claim 3 wherein said front leg extends between a lower end adapted to be pivotally coupled to the floor and an upper end pivotally coupled to a front end of said seat cushion.

5. A seat assembly as set forth in claim 4 wherein said rear leg extends between a lower end adapted to be pivotally coupled to the floor and an upper end pivotally coupled to a rear end of said seat cushion.

6. A seat assembly as set forth in claim 5 wherein said front link is fixedly secured at said first end to said front leg and said rear link is fixedly secured at said first end to said rear leg.

7. A seat assembly as set forth in claim 6 including a latch mechanism disposed between said lower end of said seat back frame and said support bracket, said latch mechanism operable between a locked state for maintaining said seat back in said upright position and an unlocked state allowing said seat back to pivot between said upright and folded positions.

8. A seat assembly as set forth in claim 7 including a passive locking mechanism operatively coupled between said seat back and said seat cushion for locking said seat back and seat cushion together when said seat assembly is in said seating position.

9. A seat assembly as set forth in claim 8 wherein said passive locking mechanism includes a first member fixedly secured to a bottom surface of said seat cushion and a second member fixedly secured to said lower end of said seat back frame, said second member lockingly engaging said first member when said seat assembly is in said seating position and releasable from said first member by pivoting said seat back forwardly thereby allowing movement of said seat assembly to said stowed position.

10. A seat assembly as set forth in claim 9 wherein said first member includes at least one tube section and said second member includes at least one clasp member extending between a proximal end fixedly secured to said lower end of said seat back frame and a free distal end having a groove therein for lockingly engaging said at least one tube section when said seat assembly is in said seating position.

11. A seat assembly for supporting an occupant above a floor in an automotive vehicle, said seat assembly comprising:

a pair of elongated brackets adapted to be mounted to the floor, each of said pair of elongated brackets extending between a forward end and a rearward end;

a seat cushion movable between a raised position at least partially spaced above the floor and a lowered position adjacent the floor;

a seat back including a seat back frame pivotally coupled at a lower end to said rearward ends of said pair of elongated brackets for movement between an upright position and a folded position overlying said seat cushion;

a front cross tube extending laterally between and rotatably coupled to said forward ends of said pair of elongated brackets;

a pair of front legs extending between lower ends fixedly secured to said front cross tube and upper ends pivotally coupled to a front end of said seat cushion;

a pair of rear legs extending between lower ends pivotally coupled to said pair of elongated brackets between said forward and rearward ends, and upper ends pivotally coupled to a rear end of said seat cushion; and a drive link assembly operatively coupled between said seat back and said seat cushion for automatically moving said seat cushion between said raised and lowered positions in response to pivoting said seat back between said upright and folded positions thereby defining a seating position and a stowed position of said seat assembly, said drive link assembly including a front link fixedly secured at a first end to said front cross tube and pivotally coupled at a second end to a first end of a drive link, and a rear link fixedly secured at a first end to said lower end of said seat back frame and pivotally coupled at a second end to a second end of said drive link.

12. A seat assembly as set forth in claim 11 including a latch mechanism disposed between said lower end of said seat back frame and said rearward end of one of said pair of elongated brackets, said latch mechanism operable between a locked state for maintaining said seat back in said upright position and an unlocked state allowing said seat back to pivot between said upright and folded positions.

13. A seat assembly as set forth in claim 12 including a passive locking mechanism operatively coupled between said seat back and said seat cushion for locking said seat back and seat cushion together when said seat assembly is in said seating position.

14. A seat assembly as set forth in claim 13 wherein said passive locking mechanism includes a first member fixedly secured to a bottom surface of said seat cushion and a second member fixedly secured to said lower end of said seat back frame, said second member lockingly engaging said first member when said seat assembly is in said seating position and releasable from said first member by pivoting said seat back forwardly thereby allowing movement of said seat assembly to said stowed position.

15. A seat assembly as set forth in claim 14 wherein said first member includes at least one tube section and said second member includes at least one clasp member extending between a proximal end fixedly secured to said lower end of said seat back frame and a free distal end having a groove therein for lockingly engaging said at least one tube section when said seat assembly is in said seating position.

16. A seat assembly for supporting an occupant above a floor in an automotive vehicle, said seat assembly comprising:
- a seat cushion adapted to be pivotally coupled to the floor for movement between a raised position at least partially spaced above the floor and a lowered position adjacent the floor;
- a seat back adapted to be pivotally coupled to the floor for movement between an upright position and a folded position overlying said seat cushion; and
- at least one drive link extending between a first end pivotally coupled to said seat back and a second end pivotally and slidably coupled to said seat cushion for automatically moving said seat cushion between said raised and lowered positions in response to pivoting said seat back between said upright and folded positions thereby defining a seating position and a stowed position of said seat assembly.

17. A seat assembly as set forth in claim 16 including front and rear legs pivotally coupled between said seat cushion and the floor for allowing movement of said seat cushion between said raised and lowered positions.

18. A seat assembly as set forth in claim 17 wherein said front and rear legs extend between lower ends adapted to be pivotally coupled to the floor and upper ends pivotally coupled to respective front and rear ends of said seat cushion.

19. A seat assembly as set forth in claim 18 wherein said seat back includes a seat back frame pivotally coupled at a lower end to a support bracket adapted to be fixedly secured to the floor.

20. A seat assembly as set forth in claim 19 wherein said first end of said at least one drive link is pivotally coupled to said lower end of said seat back frame and said second end of said at least one drive link is pivotally and slidably coupled to said rear leg adjacent said lower end.

21. A seat assembly as set forth in claim 20 wherein said at least one drive link is generally S-shaped and said second end includes a slot extending between a first end and a second end for receiving a pin fixedly secured to said rear leg, said slot and pin providing a lost motion connection between said seat back and said seat cushion.

22. A seat assembly as set forth in claim 21 wherein said pin is disposed at said first end of said slot when said seat assembly is in said seating and stowed positions, and disposed at said second end of said slot for moving said seat cushion from said raised position to said lowered position.

23. A seat assembly as set forth in claim 22 wherein said lower end of said seat back frame includes a hook for selectively engaging a striker fixedly secured to said seat cushion to provide stability to said seat cushion in said raised position.

24. A seat assembly as set forth in claim 23 wherein said lost motion connection allows a pre-determined amount of pivotal movement of said seat back from said upright position toward said folded position without any corresponding movement of said seat cushion to allow said hook to disengage from said striker.

25. A seat assembly as set forth in claim 24 including a recliner mechanism disposed between said lower end of said seat back frame and said support bracket, said recliner mechanism operable between a locked state for maintaining said seat back in said upright position and an unlocked state allowing said seat back to pivot between said upright and folded positions.

26. A seat assembly as set forth in claim 25 including a spring for biasing said seat back toward said folded position.

27. A seat assembly as set forth in claim 26 wherein said spring is disposed between said lower end of said seat back frame and said support bracket.

28. A seat assembly as set forth in claim 27 including a headrest operatively coupled to an upper end of said seat back for movement between a use position extending generally longitudinally with said seat back and a stowed position disposed generally perpendicular to said seat back in response to pivoting said seat back from said upright position to said folded position.

* * * * *